Aug. 3, 1937.  W. H. ALEXANDER  2,088,986
POWER OPERATED LATCH RELEASE FOR SLIDING REACH TRAILERS
Filed April 4, 1936
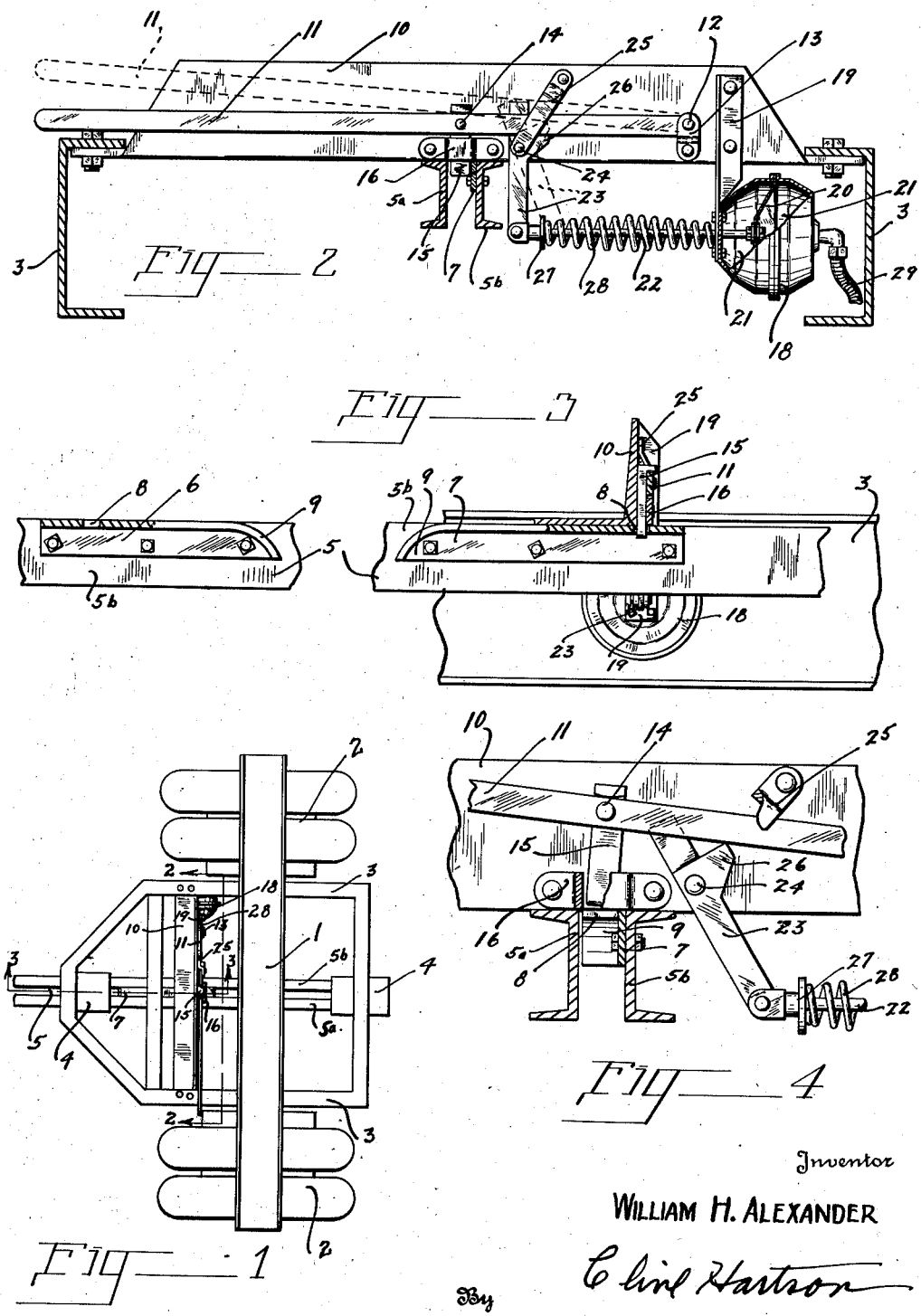
Inventor
WILLIAM H. ALEXANDER
By Cline Hartson
Attorney Patented Aug. 3, 1937

2,088,986

UNITED STATES PATENT OFFICE 2,088,986

POWER OPERATED LATCH RELEASE FOR SLIDING REACH TRAILERS

William H. Alexander, Klamath Falls, Oreg.

Application April 4, 1936, Serial No. 72,745

3 Claims. (Cl. 280—33.44)

My invention relates to a previous invention of mine as set forth in Patent Number 2,038,156, dated April 21, 1936.

In the prior invention I have shown manual means for unseating a latch. This latch is employed to secure a trailer in either of two positions with regard to a reach. This reach has its forward end secured to a truck. The trailer is slidable relative to the reach, unless restrained by the latch, allowing the trailer to be positioned in either of two positions, one where it is in trailing position to carry a load, and the other wherein it is supported and carried by the truck when it, the trailer, is carrying no load. The latch is employed for securing the trailer in either of these two positions.

The object of the present invention is to provide power means for seating or unseating the latch in either of its two positions, which power means may be operated from the cab of the truck thus making it unnecessary for the operator to leave the cab when changing the position of the trailer.

Another object of the invention is to construct the invention in a more or less compact unit whereby it may be easily mounted to the average trailer of the type referred to in my aforesaid patent.

Another object of the invention is to make the operating mechanism simple in construction and to adopt construction which will not readily get out of order.

This and other objects of the invention will be ascertained upon reading the description of the invention following, aided by the drawing illustrating the same.

In the drawing:

Figure 1 is a plan view of a log trailer.

Figure 2 is the sectional view indicated by section line 2—2 in Figure 1.

Figure 3 is the sectional view indicated by section line 3—3 in Figure 1.

Figure 4 is an enlarged fragmentary detail of Figure 2.

Referring to the drawing, the numeral 1 indicates a log trailer, having ground wheels 2, frame 3, and reach seats 4, which seats are slidable about the reach 5. The reach is formed in this instance of spaced parallel members 5a and 5b. Secured to the member 5b are two or more latch plates, two in this instance, and indicated respectively by the numerals 6 and 7. Plate 6 is the forward plate and plate 7 the rearward plate.

These plates have latch seats 8 and inclined rear and front ends 9 respectively. A latch or locking lug provided on the trailer enters one or the other seat. These plates are so positioned longitudinally of the reach 5 so that when the lug seats in the seat of rearward plate 7 the trailer is in trailing position, while when it seats in the seat of the forward plate 6 the trailer is in supported position. It is to be understood that the forward end of reach 5 is pivotally attached to a truck, and when the trailer is in supported position it is being carried by such truck. This means for supporting and carrying the trailer and attaching the reach to the truck is fully and clearly described and illustrated in my patent heretofore referred to.

Mounted crosswise of the frame 3 is the cross member 10 to which is pivotally mounted the lever 11 by means of pin 12 and outside brace 13. Pivotally connected to lever 11 by means of a pin 14 is a locking lug 15 which is movable up and down in guide 16 upon raising and lowering lever 11. Lug 15 is in line to enter either seat 8 in plate 7 or seat 8 in plate 6. The weight of the lever causes the lug to enter the one or the other seat, and to remove it from a seat the lever 11 is raised, or the mechanism hereinafter described, operated. When the lug is seated in a seat in one of the plates 6 or 7, it secures the trailer in supported or trailing position as the case may be. When the lug has been removed from one seat and the reach and trailer are moved relatively to each other, the lug will engage one or the other inclined faces 9 and will climb up such face and travel upon the upper face of plate 6 or 7 as the case may be until it drops or seats in a seat 8.

The mechanism next described provides a power means for operating the lever 11 whereby it will be unnecessary for the driver of the truck to dismount when he desires to unseat the lug 15 from a seat 8. This consists of a vacuum cylinder 18 which is supported by the arm 19 secured to member 10. This cylinder is provided with a diaphragm 20 and a vacuum chamber 21. Attached to the diaphragm is one end of rod 22 the other end of which is pivotally connected to the lever 23 which lever is pivoted to pin 24 supported by the member 10 and the offset brace member 25, the lever being situated between members 10 and 25. Lever 23 is provided with a projecting dog 26 which when such lever is moved to the right as shown in Figure 4, engages and raises lever 11 thus removing lug 15 from a seat 8. However when the lever is in normal vertical position as shown in Figure 2, the dog 26 allows lever 11 to move downward to a position wherein the lug 15 seats or can seat in a seat 8. Secured about rod 22 is a stationary sleeve 27 and between this sleeve and arm 19 is a coil spring 28 which returns the lever 23 to and holds it in the upright position shown in Figure 2. For the purpose of evacuating chamber 21 a pipe 29 connects therewith and in turn connects with the inlet manifold of the engine driving the truck associated with the trailer 1.

In operation the pipe 29 is provided with a suitable valve operable from the truck cab. When such valve is opened the vacuum condition or suction of the intake manifold causes the diaphragm to move to the right in Figure 2 thus moving rod 22 and lever 23 and causing dog 26 to raise lever 11 and unseat lug 15 from a seat 8 after which the valve is closed, allowing the spring 28 to restore the lever 23 to normal position and allowing the lever 11 to settle and the lug 15 to seat in a seat.

The foregoing invention is a compact unit the essential elements of which are mounted to the cross member 10. This compact assembly permits quick and easy installation upon the average log trailer, for aside from the plates 6 and 7 all essential elements of the invention are mounted to member 11, and this member can be quickly and easily mounted to a trailer.

While a specific form of the improvement has been described and illustrated herein, it is desired to be understood that the same may be varied, within the scope of the appended claims, without departing from the spirit of the invention.

Having described my invention, I claim—

1. A reach latch release for trailers, comprising a latch lug and a manual lever connected thereto having a direction of movement seating the lug and a direction of movement unseating the lug, a second lever having a normal inoperative position, a dog projecting from the second lever engageable with the first lever when the second lever is moved in one direction and when so moved moving the first lever in the direction for unseating the lug, power means for moving the second lever in the direction aforesaid, and means restoring the second lever to inoperative position after cessation of operation of the power means.

2. A latch release for trailers, comprising a latch lug and a manual lever connected thereto having a direction of movement seating the lug and a direction of movement unseating the lug, a second lever having a normal inoperative position, a dog projecting from the second lever engageable with the first lever when the second lever is moved in one direction and moving the first lever in the direction unseating the lug, a support member, a rod connected to the free end of the second lever and extending through the support member, a sleeve upon the rod, a spring engaging sleeve and support member and maintaining the second lever in normal inoperative position, and power means connected to the rod for moving the second lever against the action of the spring.

3. A latch release for trailers, comprising a latch lug and a manual lever connected thereto having a direction of movement seating the lug and a direction of movement unseating the lug, a second lever having a normal inoperative position and an angularly arranged portion engageable with the first lever when the second lever is moved in one direction and moving the first lever in the direction unseating the lug, an arm, a rod connected to the free end of the second lever and extending through the arm, a sleeve upon the rod, a spring engaging the sleeve and arm and maintaining the second lever in normal inoperative position, and means connected to the rod for moving the second lever against the action of the spring.

WILLIAM H. ALEXANDER.